United States Patent
Wilson

(10) Patent No.: US 6,173,730 B1
(45) Date of Patent: Jan. 16, 2001

(54) CHARGING AND BLEED VALUE

(75) Inventor: Robert Keller Wilson, Granger, IN (US)

(73) Assignee: Robert Bosch Corporation, Broadview, IL (US)

(*) Notice: Under 35 U.S.C. 154(b), the term of this patent shall be extended for 0 days.

(21) Appl. No.: 09/372,130

(22) Filed: Aug. 11, 1999

(51) Int. Cl.[7] ............................................. F16K 17/04
(52) U.S. Cl. ........................ 137/115.15; 137/115.16; 137/115.2
(58) Field of Search ..................... 137/102, 115.15, 137/115.16, 115.2

(56) References Cited

U.S. PATENT DOCUMENTS

| | | | |
|---|---|---|---|
| 3,604,446 | * | 9/1971 | Brooks ............................. 137/115.03 |
| 3,845,776 | * | 11/1974 | Ueda ................................. 137/115.2 |
| 3,939,859 | * | 2/1976 | Ueda et al. ...................... 137/115.15 |

* cited by examiner

*Primary Examiner*—Stephen M. Hepperle
(74) *Attorney, Agent, or Firm*—Leo H McCormick, Jr.; Warren Comstock

(57) ABSTRACT

A valve (60) for use in a brake system (10) through which a source (32) of fluid charges an accumulator (24) to a desired fluid pressure level and through which fluid pressure present in a conduit (52) is communicated to a reservoir (33) in the absence of the flow of fluid from the source. The valve (60) has a housing (62) with a bore (64) therein with an entrance port (66) connected to the source of fluid (32), an exit port (68) connected by a flexible conduit (52) to the accumulator (24) and exhaust port (70) connected to the reservoir (33). A sleeve (72) which is located in bore (64) has an internal bore (74) with a first diameter (82) for retaining a first ball (90), a second diameter (80) for retaining a linkage member (94) and a third diameter (86) for retaining a second ball (92). A first spring (93) urges the first ball (90) toward a first seat (84') formed between the first (82) and second (80) diameters. A second spring (100) urges the sleeve (72) toward a rest position to allow the first spring (93) to seat the first ball (90) on the first seat (84') to prevent the flow of fluid from the source (32) to the accumulator (24) while allowing free communication between the exit port (68) and the exhaust port (70) to permit fluid pressure in the flexible conduit (52) to be dissipated in the reservoir (33). The communication of fluid from the source (32) to the entrance port (66) developing a force across the sleeve (72) which moves the second ball (90) into engagement with an exhaust port (70) to interrupt communication to the reservoir (33) and allow fluid to flow from the entrance port (66) to the exit port (68) for charging the accumulator (24).

6 Claims, 2 Drawing Sheets

CHARGING AND BLEED VALUE

This invention relates to a valve through which fluid flows from a source to charge an accumulator in a brake system and which allows fluid to flow from the conduit to a reservoir in the absence of flow of fluid from the source.

BACKGROUND OF THE INVENTION

In brakes systems it has become a common practice to include a traction control function along with anti-lock brake capabilities. The traction control function utilizes may of the components necessary to achieve the anti-lock brake capabilities. However, in order for the traction control function to achieve a desired level of operation, an accumulator is often included in the brake system. The accumulator is charged to a desired pressure level by the operation of a pump in the brake system. In charging the accumulator fluid is communicated from the pump through a flexible conduit. Unfortunately, the fluid pressure developed by the pump to charge the accumulator is maintained in the conduit even after the pump has been turned off and as a result after a period of time and under some conditions it is possible that a leak may occur in the flexible conduit. In order to relieve the fluid pressure in the conduit it has been suggested that the flexible conduit be permanently connected to a reservoir through a restricted orifice. This permanent connection allows the fluid pressure in the conduit to bleed to reservoir pressure over a period of time. Unfortunately this permanent connection also allows a portion of the fluid supplied to the accumulator by the pump to flow to the reservoir during the charging function and as a result the efficiency of the pump is reduced by this flow to the reservoir.

SUMMARY OF THE INVENTION

In order to utilize the full capacity of a pump to charge an accumulator, the present invention has a valve which allows the entire output of a pump to flow to an accumulator during a charging operation and when the flow from the pump terminates thereafter allows fluid to flow from a flexible conduit to a reservoir. The valve has a housing with a first bore therein connected to the pump through an entrance port, to the accumulator through an exit port and to the reservoir through an exhaust port. A sleeve located in the first bore has a first end adjacent the entrance port and a second end adjacent the exhaust port. A second bore in the sleeve which extends from the first end to the second end has a central diameter section separated from a first end diameter section by a first shoulder and from a second end diameter section by a second shoulder. A first ball located in the first end diameter section is urged by a first spring toward the first shoulder. A flange on the second end of the sleeve retains a second ball in the second diameter section of the sleeve. Linkage located in the central diameter section has a first end, which engages the first ball, and a second end, which engages the second ball. A second spring located in the first bore urges the sleeve toward the entrance port to allow the first spring to seat the first ball on the first shoulder. With the first ball seated fluid communication is prevented through the central diameter section while permitting free communication between the exit port and the exhaust port to allow fluid in the conduit to flow to the reservoir. When the pump is activated fluid flow is communicated to the entrance port. The pressure of the fluid presented to the entrance port develops a charging force which acts on the first end of the sleeve and after overcoming the second spring initially moves the sleeve toward the exhaust port. As the sleeve approaches the exhaust port, the second ball is first to engage an exhaust seat surrounding said exhaust port. On engagement of the second ball with the seat fluid communication from the first bore to the reservoir is interrupted. Further movement of the sleeve occurs as the second spring is compressed, however, the second ball remains in a stationary position on the exhaust seat and the first ball which is connected by the linkage to the first ball also remains stationary as the first spring is now compressed with a charging seat of the first shoulder moving away from the first ball to allow fluid to flow to the accumulator by way of the second bore and exhaust port. When the accumulator is charged, flow of fluid through the second bore terminates and the fluid pressure across the sleeve equalizes such that the second spring moves the sleeve toward the entrance port and again initiate communication between the exit port and exhaust ports as the first ball is again seated on the charging seat.

An advantage of the present invention is provided by limiting the time that a flexible conduit is under high pressure.

An object of this invention is to provide a valve for charging an accumulator and for bleeding a flexible conduit when the accumulator is charged to utilize a full capacity of a pump while limiting the exposure of a conduit to high pressure.

A further advantage of this invention resides in a valve, which sequentially closes a flow communication path between an exit port and an exhaust port while opening a communication path between an entrance port and the exit port to supply pressurized fluid to an accumulator.

DETAILED DESCRIPTION

Figure 1:
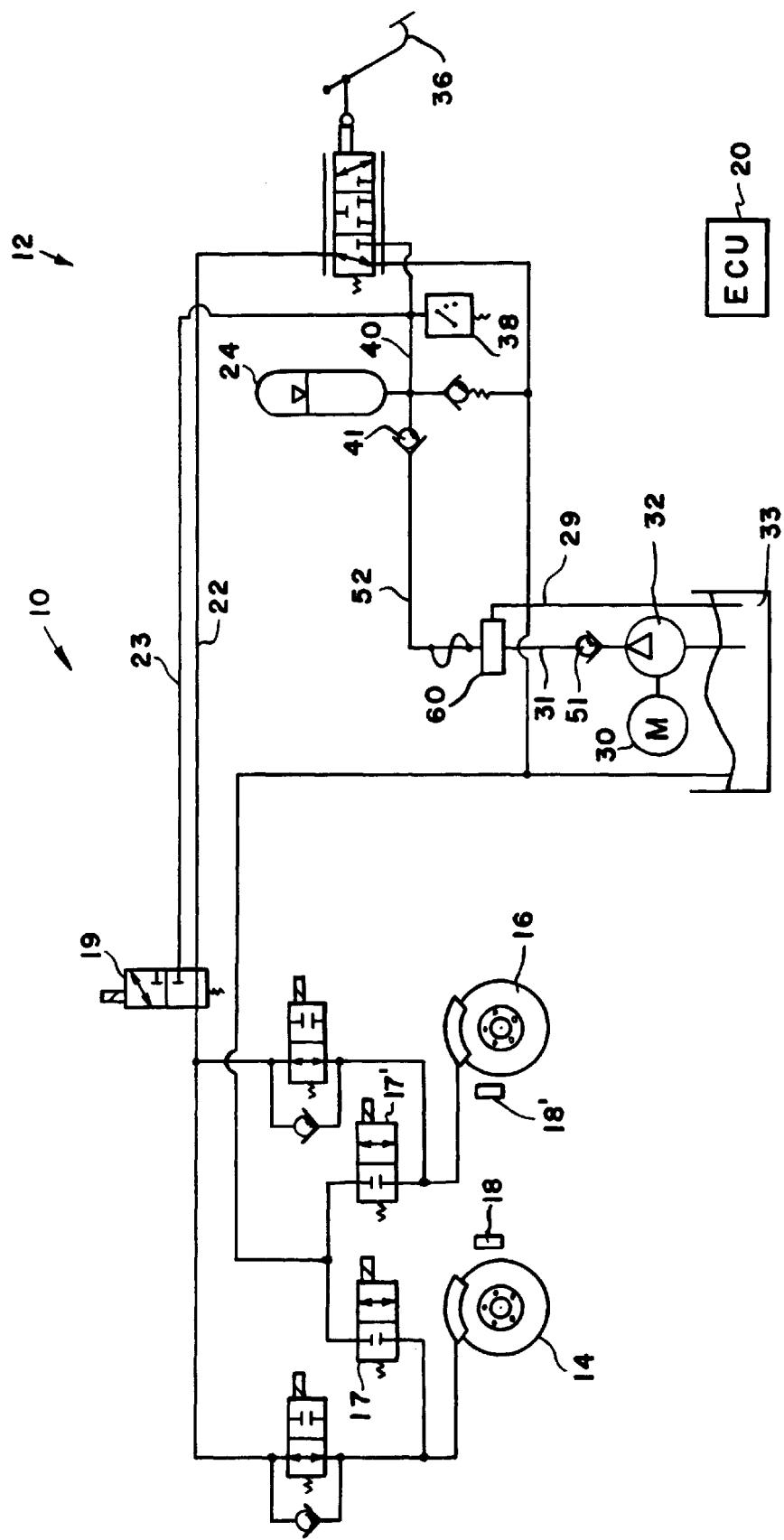
FIG. 1 is a schematic illustration of a brake system having an anti-lock brake system with traction control with a valve to charge an accumulator and exhaust a flexible conduit according to the present invention.

A portion of a brake system 10 is illustrated in FIG. 1 for a vehicle having an actuation section 12 connected to first 14 and second 16 wheel brakes. The first 14 and second 16 wheel brakes each have speed sensors 18,18' which supply information to an ECU 20 for the vehicle and various solenoid valves 17,18 and 17'18' for performing an anti-lock function. In addition a solenoid 19 connected in a supply conduit 22 from a brake booster 34 and an actuation conduit connected to an accumulator 24. Solenoid 19 is dedicated to performing a traction control function in responds to an input from the ECU 20. A pump 32 supplies the accumulator 24 and the brake booster 34 with pressurized fluid to effect a brake application in response to an input applied to pedal 36. A pressure switch 38 connected to a supply conduit 40 between the accumulator 24 and brake booster 34 is connected to the ECU 20. Signals from the pressure switch 38 control the operation of pump 32 for the development of pressurized fluid which is communicated through flexible conduit 52 to the supply conduit 40 and accumulator 24. When accumulator 24 is charged to a desired fluid pressure level, pressure switch 38 communicates a signal to the ECU 20 a motor 30 associated with pump 32 is switched to an off mode. In order that the flexible conduit 52 is not continually exposed to high pressure once accumulator 24 is charged, a valve 60 allows fluid in the flexible conduit 52 to be communicated through conduit 53 to reservoir 33 for pump 32.

Figure 2:
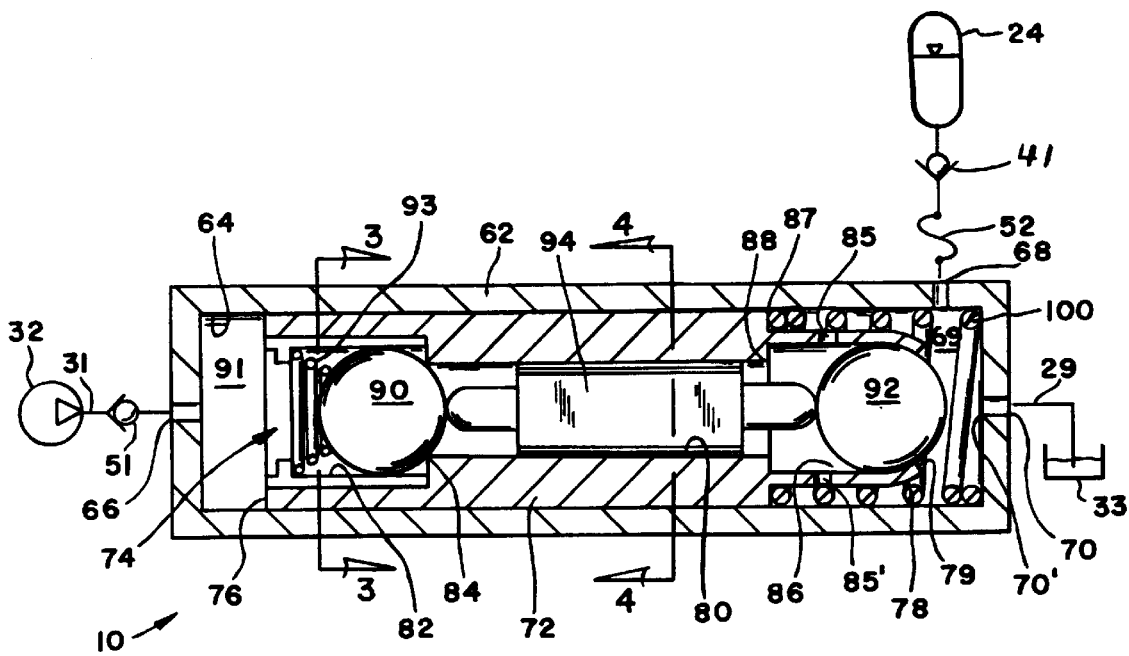
FIG. 2 is a sectional view of the valve of FIG. 1 with an exit port connected to an exhaust to provide for communication to a reservoir.
Figure 3:
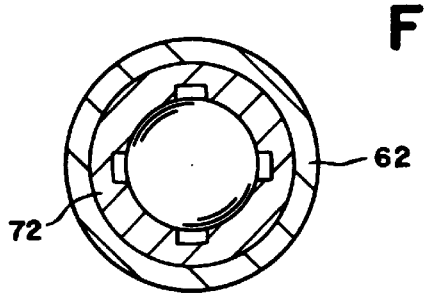
FIG. 3 is a sectional view taken along line 3—3 of FIG. 2.

In more particular detail the valve 60 as shown in FIG. 2 has a housing 62 having a first bore 64 therein. Housing 62 has an entrance port 66 connected to pump 32 by a conduit 31, an exit port 68 connected to accumulator 24 by flexible conduit 52 and an exhaust port 70 connected to the reservoir 33 by conduit 29. A sleeve 72 is located in bore 64 has a second bore 74 that extends from a first end 76 to a second end 78. The second bore 74 has a central diameter section 80 separated from a first end diameter section 82 by a first shoulder 84 and from a second end diameter section 86 by a second shoulder 88. The sleeve 72 has a plurality of axial slots 81, 81' . . . 81" separated by a corresponding plurality of lands 83, 83' . . . 83" which extend from said first end 76 to shoulder 84 to define the first diameter section 82, see FIG. 3. A first ball 90 is located in first diameter section 82 and maintained in axial alignment with a charging seat 84' formed by shoulder 84 by lands 83, 83'. . . 83". A first spring 93 retained in the first diameter section 82 of bore 74 acts on and urges first ball 90 toward charging seat 84 to define a charging chamber 91 within bore 64.

The sleeve 72 has a plurality of radial passages 85,85' through which the second diameter section 86 is connected with bore 64 and a second shoulder 87 located adjacent the second end 78. A second ball 92 is located in second diameter section 86 and retained in therein by a flange 79 formed by rolling end 78 in the shape of a partial sphere.

Figure 4:
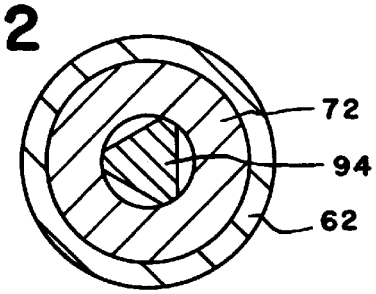
FIG. 4 is a sectional view taken along line 4—4 of FIG. 2.

A tri-angular shaped linkage 94 as best-illustrated in FIG. 4 is located in the central diameter section 80 has a first end 96 and a second end 98. The first end 96 engages the first ball 90 and the second end 98 engages the second ball 92. The length of the linkage 94 from the first end 96 to the second end 98 is such that with ball 90 seated on charging seat 84' the second ball 92 extends past end 78 of sleeve 72.

A second or return spring 100 located in bore 64 acts on shoulder 87 of sleeve 72 for urging sleeve 72 toward the charging chamber 91 and entrance port 60.

MODE OF OPERATION

Figure 5:
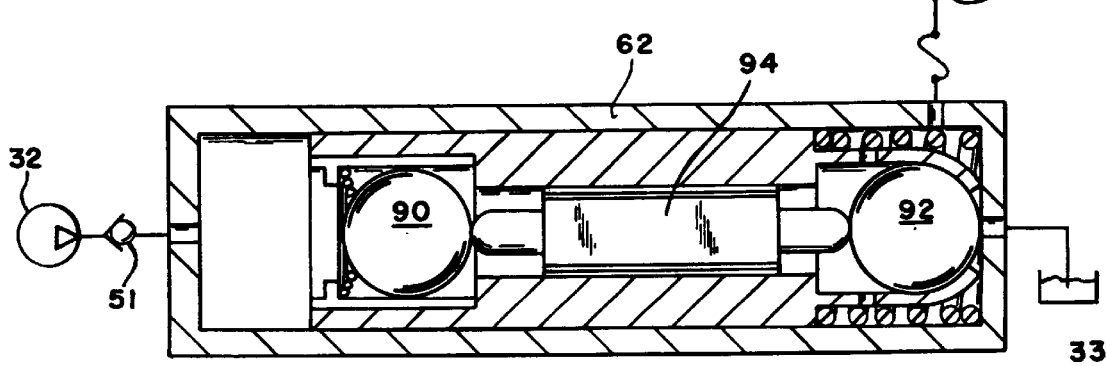
FIG. 5 is a section view of the valve in FIG. 1 with an entrance port connected to the exit port to provide for communication to an accumulator.

With a vehicle is operating and accumulator pressure switch 38 supplies the ECU 20 with an indication of fluid pressure in the accumulator 24 is less that a desired level, the ECU 20 supplies an operational signal to motor 30 to activate pump 32. Activation of pump 32 causes fluid to flow through conduit 31 to charging chamber 91 in valve 60 by way entrance port 60. When the fluid pressure in charging chamber 91 reaches a predetermined value sufficient to develop a force across end 76 of sleeve to overcome spring 100, sleeve 72 will move toward the exhaust port 70. As end 78 of sleeve 72 approaches exhaust port 70 ball 92 will first engage an exhaust seat 70' to interrupt communication between exhaust chamber 69 and reservoir 33 through exhaust port 70, see FIG. 5. As spring 100 is further compressed, ball 92 and ball 90 are held stationary and sleeve 72 continues to move toward the exhaust chamber 69 such that charging seat 84 allows metered flow of fluid to flow in the second bore 74 for distribution to accumulator 24 by way of the central diameter section 80, radial passages 85,85', exhaust chamber 69, exit port 68 and flexible conduit 52. Fluid continues to flow to the accumulator 24 until the desired fluid pressure is attained and thereafter pressure switch 38 supplies ECU 20 with a signal that the accumulator 24 is fully charged. Thereafter the ECU 20 terminates the operational signal to motor 30 and pump 32 is idled.

In the absence of the flow of fluid from pump 32, the fluid pressure in the charging chamber 91 and exhaust chamber 69 equalize and thereafter spring 100 moves sleeve 72 toward the charging chamber 91. With the pressure in the charging chamber 91 and exhaust chamber 69 substantially equal, spring 100 acts on sleeve 72 to move sleeve toward the charging chamber 91. Initial movement of sleeve 72 toward the charging chamber moves charging seat 84 into engagement with ball 90 to interrupt communication from charging chamber 91 to the second bore 74. Further movement of sleeve toward the charging chamber 91 brings flange 79 into engagement with ball 92 to move ball 92 off exhaust port 70' and allow fluid to flow to the reservoir 33.

Check valve 41 located between the flexible conduit 52 and conduit 40 assures that fluid does not flow from the accumulator 24 toward valve 60. Fluid flow from the flexible conduit 52 continues until the pressure level therein is at a value as defined by the force of spring 100. Similarly a check valve 51 in conduit 31 assures that the fluid pressure in charging chamber 91 is not dissipated by the flow of fluid back to pump 32.

I claim:

1. A valve for use in a brake system through which a source of fluid charges an accumulator to a desired fluid pressure level and through which fluid pressure present in a conduit is communicated to a reservoir in the absence of the flow of fluid from said source, said valve comprising:

a housing having a first bore therein with an entrance port connected to said source of fluid, an exit port connected to said accumulator and an exhaust port connected to said reservoir;

a sleeve located in said first bore, said sleeve having a second bore that extends from a first end to a second end, said second bore having a central diameter section separated from a first end diameter section by a first shoulder and from a second end diameter section by a second shoulder;

a first ball located in said first end diameter section, a first spring for urging said first ball toward said first shoulder;

a second ball located in said second diameter section and retained in said second diameter section by a flange on said second end of said sleeve;

linkage located in said central diameter section having a first end and a second end, said first end engaging said first ball and said second end engaging said second ball; and a second spring located in said first bore for urging said sleeve toward said entrance port to allow said first spring to seat said first ball on said first shoulder and prevent communication between said central diameter section and said entrance port while permitting communication free communication between said between said exit port and said exhaust port to allow fluid in said conduit to flow to said reservoir, said second spring being compressed by a charging force developed by pressurized fluid from said source acting on said first end of said sleeve, said charging force initially moving said sleeve toward said exit port to bring said second ball into engagement with an exhaust seat surrounding said exhaust port to interrupt communication from said first bore to said reservoir and with further movement compress said first spring to allow said first ball to move off an communication seat defined by said first shoulder and allow fluid to flow to said accumulator by way of said second bore and exhaust port.

2. The valve as recited in claim 1 wherein said sleeve further includes a plurality of radial passages through which said second diameter section is connected with said first bore to allow fluid to freely flow to said exit port.

3. The valve as recited in claim 2 wherein said sleeve further includes a plurality of axial slots separated by a corresponding plurality of lands which extend from said first end to said first shoulder, said first ball being aligned by said second bore by said plurality of lands while said plurality of axial slots allow fluid to be freely communicated to said central diameter section.

4. The valve as recited in claim 3 wherein said plurality of lands define said first diameter section of said sleeve.

5. The valve as recited in claim 4 wherein in the absence of flow of fluid from said source through said entrance port the fluid pressure acting on said first end of said sleeve and said second end of said sleeve equalized and said second spring thereafter moves said sleeve away from said exhaust port to interrupt communication between said central diameter section while opening communication between said exit port and said exhaust port to allow fluid to flow from said conduit to said reservoir and thereby relieve any pressure in the fluid in said conduit.

6. The valve as recited in claim 5 further including a first check valve in said conduit which restricts the flow of fluid from said accumulator toward said exit port and a second check valve in a second co conduit which restricts the flow of fluid from entrance port toward said source of fluid.

* * * * *